(12) United States Patent
Staib

(10) Patent No.: US 6,171,440 B1
(45) Date of Patent: Jan. 9, 2001

(54) PROCESS FOR REPULPING WET STRENGTH PAPER HAVING CATIONIC THERMOSETTING RESIN

(75) Inventor: Ronald R. Staib, Wilmington, DE (US)

(73) Assignee: Hercules Incorporated, Wilmington, DE (US)

(*) Notice: Under 35 U.S.C. 154(b), the term of this patent shall be extended for 0 days.

(21) Appl. No.: 09/336,217

(22) Filed: Dec. 4, 1998

Related U.S. Application Data

(63) Continuation-in-part of application No. 09/001,803, filed on Dec. 31, 1997, now abandoned.

(51) Int. Cl.[7] .................................................. D21B 1/08
(52) U.S. Cl. ...................................... 162/4; 162/5; 162/8
(58) Field of Search ............................. 162/4.5, 6, 8, 199

(56) References Cited

U.S. PATENT DOCUMENTS

| | | | | |
|---|---|---|---|---|
| 3,311,504 | * | 3/1967 | Earle, Jr. ............................. | 260/77.5 |
| 4,287,110 | * | 9/1981 | Takagishi et al. ................... | 260/29.2 |
| 5,585,456 | * | 12/1996 | Dulaney et al. ..................... | 528/332 |

* cited by examiner

*Primary Examiner*—Dean T. Nguyen
(74) *Attorney, Agent, or Firm*—Martin F. Sloan; Ivan G. Szanto

(57) ABSTRACT

Process for repulping paper comprising providing paper comprising thermosetting resin which is the reaction product of epihalohydrin and polyamide made from polyalkylene polyamine, succinic acid and optionally another dicarboxylic acid and repulping the paper to obtain recycled pulp fibers.

42 Claims, No Drawings

PROCESS FOR REPULPING WET STRENGTH PAPER HAVING CATIONIC THERMOSETTING RESIN

CROSS REFERENCE TO RELATED APPLICATION

This application is a continuation-in-part of application Ser. No. 09/001,803 filed Dec. 31, 1997 now abandoned.

BACKGROUND OF THE INVENTION

1. Field of the Invention

This invention relates to a process for repulping wet strength paper and more particularly it relates to such a process incorporating in the paper a cationic thermosetting resin.

2. Description of the Prior Art

Wet strength resins are often added to paper including paperboard at the time of manufacture. In the absence of wet strength resins, paper normally retains only 3% to 5% of its strength after being wetted with water. However, paper made with wet strength resin generally retains at least 10%–50% of its strength when wet. Wet strength is useful in a wide variety of paper applications, some examples of which are toweling, milk and juice cartons, paper bags, and liner board for corrugated containers.

As stated in Handbook for Pulp and Paper Technologists, Gary A. Smook, Angus Wilde Publications, 1992: "Paper has traditionally been defined as a felted sheet formed on a fine screen from a water suspension of fibers. Current paper products generally conform to this definition except that most products also contain non-fibrous additives. Dry forming methods are now utilized for the manufacture of a few specialty paper products. Pulp is the fibrous raw material for papermaking. Pulp fibers are usually of vegetable origin, but animal, mineral, or synthetic fibers may be used for special applications. The distinction between paper and paperboard is based on product thickness. Nominally, all sheets above 0.3 mm thickness are classed as paperboard; but enough exceptions are applied to make the distinction somewhat hazy."

Because of increased commercial emphasis on developing paper products based on recovered cellulose, there is growing interest in developing paper which is readily repulpable. Paper and paperboard waste materials are difficult to repulp in aqueous systems without special chemical treatment when they contain wet strength resins.

Improving the repulpability of paper containing wet strength resins has generally been achieved by modifying the repulping conditions.

In U.S. Pat. No. 2,872,313, House et al. teach the use of hypochlorite salts to repulp paper containing polyaminoamide/epichlorohydrin wet strength resins. Miller, in U.S. Pat. No. 3,427,217, teaches the use of oxidizing salts such as sodium hypochlorite, ammonium persulfate and others, to repulp wet strength paper containing resins such as polyaminoamide/epichlohydrin resins, urea-formaldehyde and melamine-formaldehyde resins, etc. Although the hypochlorite salts effectively repulp wet strength paper, they are also chlorinating agents under some conditions and can form environmentally undesirable chlorine-containing degradation products in the process effluents.

Schmalz, in TAPPI, 44, no. 4, pp 275–280, April 1961, teaches the repulping of polyaminoamide/epichlorohydrin resin-containing paper with hypochlorite, or with strong alkali. Although the alkali method will not chlorinate organic byproducts, it is a relatively slow process.

Espy, in European Patent Application Publication No. 585,955-A, discloses a composition for repulping paper containing polyaminoamide/epichlorohydrin wet strength resins in an aqueous slurry, which comprises treatment with a non-chlorinated oxidizing agent and an alkali that is a water-soluble buffering salt capable of maintaining a pH of 7–12 in the aqueous reaction mixture.

Caropreso et al., in PCT International Publication No. WO 94/20682 disclose a composition containing a persulfate and a carbonate, bicarbonate or sesquicarbonate, which composition is suitable for oxidizing wet strength resin used in wet strength paper. The combination is stated to decrease the time required to repulp wet strength paper.

In U.S. Pat. No. 5,330,619, Henry et al. teach a method for treating fibrous sheet materials, such as paper or paperboard containing wet strength resin, which comprises reacting the fibrous materials with an enzyme to hydrolyze the resin and thereby improve repulping of the fibrous materials.

Copending application filed Jun. 3, 1996 (Hercules' Docket No. Dasgupta Case 12 "Process of Repulping Wet Strength Paper" Sunil P. Dasgupta) discloses a process for repulping paper by providing paper comprising at least one coacervate complex made from at least one cationic polymer and at least one anionic polymer and repulping the paper to obtain recycled pulp fibers.

Since many of the repulping processes used for wet strength paper result in formation of environmentally undesirable chlorine-containing degradation products, involve strong oxidizing agents, or proceed slowly, there is a need for improved methods for making wet strength paper that will be readily repulpable without significantly lowering the wet and dry strength properties of the paper.

SUMMARY OF THE INVENTION

According to the present invention there is provided a process for repulping paper comprising:

(a) providing paper comprising at least one cationic thermosetting resin comprising the reaction product of
  (i) at least one polyamide having secondary amine groups made from reactants comprising ($\alpha$) at least one polyalkylene polyamine, ($\beta$) at least one of succinic acid or its ester or anhydride and ($\gamma$) optionally at least one dicarboxylic acid (other than succinic acid) or its ester or anhydride, and (ii) epihalohydrin; and (b) repulping the paper to obtain recycled pulp fibers.

Further according to the present invention there are provided recycled pulp fibers made by the process for repulping paper, paper made from such recycled pulp fibers and repulpable, wet strength paper made with cationic wet strength resin.

DETAILED DESCRIPTION OF THE INVENTION

Cationic thermosetting resins suitable for use in the present invention comprise the reaction product of polyamides having secondary amine groups and epihalohydrin. The polyamides are made from polyalkylene polyamines, succinic acid or its ester or anhydride and optionally dicarboxylic acid (other than succinic acid) or its ester or anhydride.

The dicarboxylic acids contemplated for use in the present invention are saturated aliphatic dicarboxylic acids, preferably containing from 3 to 8 carbon atoms, such as: malonic, glutaric, adipic, and so on. Of these the saturated aliphatic acids having from 4 to 6 carbon atoms in the molecule, such as glutaric and adipic are most preferred. Blends of two or more of these dicarboxylic acids may also be used, as well as blends of one or more of these with higher saturated aliphatic dicarboxylic acids, such as azelaic, sebacic, as long as the resulting long chain polyamide is water-soluble.

A variety of polyalkylene polyamines including polyethylene polyamines, polypropylene polyamines, polybutylene polyamines and so on may be employed herein of which the polyethylene polyamines represent an economically preferred class. More specifically, the polyalkylene polyamines of this invention are polyamines containing two primary amine groups and at least one secondary amine group in which the nitrogen atoms are linked together by groups of the formula —$C_nH_{2n}$— where n is a small integer greater than unity and the number of such groups in the molecule ranges from two up to about eight and preferably up to about four. The nitrogen atoms may be attached to adjacent carbon atoms in the group —$C_nH_{2n}$— or to carbon atoms farther apart, but not to the same carbon atom. This invention contemplates not only the use of such polyamines as diethylenetriamine, triethylenetetramine, tetraethylenepentamine, dipropylenetriamine, and the like, which can be obtained in reasonably pure form, but also mixtures and various crude polyamine materials. For example, the mixture of polyethylene polyamines obtained by the reaction of ammonia and ethylene dichloride, refined only to the extent of removal of chlorides, water, excess ammonia, and ethylenediamine, is a very satisfactory starting material. Most preferred are the polyethylene polyamines containing from two to four ethylene groups, two primary amine groups, and from one to three secondary amine groups, e.g. diethylenetriamine (DETA).

The term "polyalkylene polyamine" employed in the claims, therefore, refers to and includes any of the polyalkylene polyamines referred to above or to a mixture of such polyalkylene polyamines and derivatives thereof.

It is desirable, in some cases, to increase the spacing of secondary amine groups on the polyamide molecule in order to change the reactivity of the polyamide-epichlorohydrin complex. This can be accomplished by substituting an aliphatic diamine such as ethylenediamine, propylenediamine, hexamethylenediamine or a heterocyclic diamine such as piperazine or the like for a portion of the polyalkylene polyamine. For this purpose up to about 60% of the polyalkylene polyamine may be replaced by a molecularly equivalent amount of the diamine. Usually a replacement of about 30% or less will serve the purpose.

The temperatures employed for carrying out the reaction between the dicarboxylic acid and the polyalkylene polyamine may vary from about 110° C. to about 250° C. or higher at atmospheric pressure. For most purposes however temperatures between about 160° C. to about 210° C. have been found satisfactory and are preferred. Where reduced pressures are employed somewhat lower temperatures may be utilized. The time of reaction depends on the temperatures and pressures utilized and will ordinarily vary from about ½ to 2 hours, although shorter or longer reaction times may be utilized depending on reaction conditions. In any event, the reaction is desirably continued to substantial completion for best results.

In carrying out the reaction, it is preferred to use an amount of dicarboxylic acid sufficient to react substantially completely with the primary amine groups of the polyalkylene polyamine but insufficient to react with the secondary amine groups to any substantial extent. This will usually require a mole ratio of polyalkylene polyamine (including aliphatic diamine if present) to dicarboxylic acid of at least about 0.9:1 more preferably at least about 0.92:1. However, mole ratio of at least about 0.8:1 may be used with quite satisfactory results. The mole ratio of polyalkylene polyamine to dicarboxylic acid can be up to about 1.4:1, preferably up to about 1.14:1 and more preferably up to about 1.2:1. Mole ratios outside of these ranges are generally unsatisfactory. Thus, mole ratios below about 0.8:1 result in a gelled product or one having a pronounced tendency to gel while mole ratios above 1.4:1 result in low molecular weight polyamides. Such products do not produce efficient wet-strength resins when reacted with epichlorohydrin.

Of the dicarboxcyclic acids employed in making the polyamide generally at least about 50 mole %, preferably at least about 80 mole % and most preferably about 100 mole % of succinic acid is used. The amount of the other dicarboxylic acid can be up to about 50 mole % and preferably up to about 20 mole %.

The reduced specific viscosity (RSV), which is an indication of molecular weight, for polyamide prepolymer derived from succinic acid and diethylenetriamine can be at least about 0.080, preferably 0.10 and most preferably 0.13 dL/g. The RSV for this prepolymer can be up to about 0.20, preferably 0.175 and most preferably 0.155 dL/g.

The preferred epihalohydrin for use in the present invention is epichlorohydrin.

In converting the polyamide, formed as above described to a cationic thermosetting resin, it is reacted with epichlorohydrin at a temperature from about 45° C. to about 100° C. and preferably between about 45° and 70° C. until the viscosity of a 20% solids solution at 25° C. has reached about "C" or higher on the Gardner-Holdt scale. This reaction is preferably carried out in aqueous solution to moderate the reaction. pH adjustment is usually not necessary. However, since the pH decreases during the polymerization phase of the reaction it may be desirable, in some cases, to add alkali to combine with at least some of the acid formed.

When the desired viscosity is reached, sufficient water is then added to adjust the solids content of the resin solution to about 15% or less, the product cooled to about 25° C. and then stabilized by adding sufficient acid to reduce the pH at least to about 6 and preferably to about 5. Any suitable acid such as hydrochloric, sulfuric, nitric, formic, phosphoric and acetic acid may be used to stabilize the product.

In the polyamide-epichlorohyrin reaction, it is preferred to use sufficient epichlorohydrin to convert all secondary amine groups to tertiary amine groups and/or quaternary ammonium groups including cyclic structures. However, more or less may be added to moderate or increase reaction rates. In general, one can use at least about 0.5 mole of epichlorohydrin per mole of polyamide secondary amine. It is preferred to use at least about 0.9 mole and most preferably at least about 1.0 mole of epichlorohydrin per mole of polyamide secondary amine group. Generally, up to about 1.8 moles, preferably up to about 1.5 moles and most preferably up to about 1.3 moles of epichlorohydrin per mole of polyamide secondary amine is used.

The process for manufacturing repulpable wet strength paper according to the present invention comprises a number of steps. One step comprises forming an aqueous suspension of pulp fiber which can be performed by conventional means, i.e., known mechanical, chemical and semichemical, etc., pulping processes. Another step comprises adding to the aqueous suspension of pulp fibers the cationic thermosetting resin described above. This can be done at any point, before sheet formation or it can also be applied after sheet formation from a tub size or at a size press or from showers to the dried or partially dried sheet. Yet another step comprises sheeting and drying the aqueous suspension of fine pulp fibers containing the cationic thermosetting resin. This can be done by conventional means.

The amount of cationic wet-strength resin can be as low as about 0.05 weight % on a dry basis, based on the weight of the dried paper, preferably about 0.1 weight % and most preferably about 0.2 weight %. The maximum amount of cationic thermosetting resin is generally about 2 weight % on a dry basis, based on the weight of the dried paper, preferably about 1 weight %, and most preferably about 0.5 weight %.

The process of repulping the paper to obtain recycled pulp fibers can be carried out by any mechanical action that disperses dry pulp fibers into an aqueous pulp fiber suspension. Conditions for repulping, as well as equipment commercially used, are discussed in "Handbook for Pulp & Paper Technologists, Second Edition" by G. A. Smook, Angus Wilde Publications, 1992, pp 194–195 and 211–212, which reference is incorporated herein by reference in its entirety.

A reproducible, quantative laboratory method to determine repulpability of wet strengthened paper uses a temperature controlled disintegrator described in TAPPI method T 205 OM-88, (1988), at 3000 rpm which is incorporated herein by reference in its entirety. Fiber yield (repulpability) is measured with a Somerville fractionating screen. Conditions during repulping are 1.5% consistency at 50° C. and pH of 7 for 5 minutes. Using this test it was found that paper prepared by the process of this invention can be repulped in substantially less time than is required to repulp the same paper at about the same level of wet-strength, but containing conventional wet strength resin, e.g. Kymene® 557H aminopolyamide-epi wet strength resin.

Other wet-strength resin types that could be used in combination with the resins of the present invention as long as repulpability is not significantly adversely affected are: aminopolyamide-epi resins (e.g. Kymene® 557H-resin); polyamine-epi resins (e.g. Kymene® 736 resin), epoxide resins (e.g. Kymene® 450 and Kymene® 2064 resins); polyethylenimine, urea-formaldehyde resins; melamine-formaldehyde resins; glyoxalated polyacrylamides (e.g. Hercobond® 1000 resin, Parez 631NC); polyisocyanates; and reactive starches (oxidized starch, dialdehyde starch, blocked reactive group starch).

Other chemical additives that can be used in conjunction with wet-strength resins are: rosin size, reactive size (alkenyl succinic anhydride or alkyl ketene dimer), surface size, starch, retention aids, drainage aids, formation aids, flocculants, creping aids (adhesives and release agents), dry strength resins (cationic starch, guar gums, polyacrylamides), defoamers, scavengers for anionic trash and stickies control, fillers (clay, calcium carbonate, titanium dioxide), optical brightening aids and dyes.

The recycled pulp fibers prepared by the repulping process of the present invention can be used to make paper by conventional paper making processes, which comprise providing an aqueous suspension of the recycled pulp fibers and then sheeting and drying the aqueous suspension to obtain paper.

The wet strength resins of the present invention are suitable for use in the following areas: paper towels; napkins; facial tissue; liquid packaging board (milk carton, juice carton); poultry boxes; produce boxes; carrierboard; butchers wrap; bleached bag; poster board; table cloth; wallboard tape; currency paper; map paper; tea bag; corrugating medium; paper plates; molded products (egg cartons); laminating grades; flooring felt; coffee filter; bread wrap; multiwall bag; shingle wrap, etc.

The scope of the present invention as claimed is not intended to be limited by the following Examples which are given merely by way of illustration. All parts and percentages are by weight unless otherwise indicated.

EXAMPLE 1

Preparation of poly(adipic acid-co-succinic acid-co-DETA) prepolymer solution (0.2:0.8:1 molar ratio, prepolymer solution respectively).

DETA (15.34 g, 99.1%, 0.147 moles) was charged to the reaction vessel and heated to 75° C. Adipic acid (AA) (4.43 g, 99%, 0.030 moles) and succinic acid (SA) (14.31 g, 99%, 0.120 moles) were mixed and added to the DETA. The temperature was raised to 170° C. and the reaction was held at that temperature for three hours as the water of reaction and water of solution were removed using a Dean-Stark trap. The temperature of the molten prepolymer was reduced to 140° C. and 30 g of hot water was added. The solution pH was adjusted to 7 with 10% HCl. Total solids were 36.0% and intrinsic viscosity was 0.126 dL/g.

EXAMPLE 2

Reaction of poly(adipic acid-co-succinic acid-co-DETA) prepolymer solution (0.2:0.8:1 molar ratio, prepolymer solution respectively) with epichlorohydrin.

Prepolymer solution (21.22g, 36.0%, 0.040 moles) was charged to the reaction vessel and diluted to 15% solids with 29.7 g of water. The pH was adjusted to 8.5 with 25% NaOH and the temperature was raised to 36° C. Epichlorohydrin (4.68g, 99%, 0.050 moles) was added and the reaction was heated to 65° C. At Gardner-Holdt viscosity "Y", the crosslinking reaction was quenched by adding 15 mL of water and adjusting the pH to 4.5 using 10% HCl. The final product solids were 14.9% and the Brookfield viscosity was 150 cps (25° C., spindle #1, 60 rpm).

EXAMPLE 3

Preparation of poly (adipic acid -co-succinic acid-co-DETA) prepolymer solution (0.5:0.5:1 mole ratio, respectively) and reaction of same with epichlorohydrin.

The prepolymer solution was prepared following the procedure of Example 1 using equimolar amounts of adipic and succinic acid. The reaction of the prepolymer solution with epichlorohydrin was carried out according to the procedure of Example 2.

EXAMPLE 4 AND COMPARATIVE EXAMPLE 1

Evaluation and repulping of poly(adipic acid-co-succinic acid-co-DETA)-epi resins.

Paper handsheets were prepared from James River Marathon unbleached kraft dry lap pulp refined to 630 mL Canadian standard freeness at pH 7.5. Sheets were generated having 80 lb/3000 sq. ft. basis weight containing 0.5% resin. In Comparative Example 1 Kymene® 557H wet strength resin (available from Hercules Incorporated) was used instead of the resins of Example 2 and Example 3.

The tensile strength was determined on two week naturally aged sheets by Test Method TAPPI T494 om-88.

Wet strength was determined by the same method, using paper samples soaked in water for 2 hours.

Procedure for Measuring Repulpability

The paper was conditioned overnight at 23° C. and 50% relative humidity. The paper for testing was cut into 1 inch squares. A total of 30 g of paper was used for the test. Demineralized water (1970 ml) was added to the stainless steel container of a TAPPI Standard Pulp Disintegrator, Model SE 003. The water was heated to 50° C., and then the disintegrator was turned on, and the paper slurry was allowed to repulp for 5 to 15 minutes at 3,000 rpm by setting the appropriate number of revolutions on the disintegrator. The temperature was maintained at 50° C. throughout.

A Huygen Instruments Somerville Fractionating Screen, Model K-34 was utilized for determination of fiber yield. It was connected to a standard tap water supply at the control panel. The drain valve at the bottom of the overflow reservoir was closed and tap water was allowed to fill the screen box. The water pressure flushing the slotted screen was adjusted to 124 kPa. The water level above the screen (4 inches) was controlled by inserting the weir in the overflow reservoir. A circular 150 mesh sieve screen was placed at the discharge of the reservoir to collect fiber accepts that pass through the stainless steel slotted screen.

After the disintegrator stopped, a 300 ml aliquot of the repulped slurry was removed and added to the water-filled screen box. The Somerville Fractionating unit was run for 10 minutes after addition of the slurry, at the end of which time no more fibers could be observed in the outflow from the slotted screen. Then the unit was switched off at the control panel, and the water was allowed to drain through the 150 mesh sieve. The weir was removed from the overflow reservoir, and the weir and the reservoir were rinsed with water, which was drained through the sieve.

The screen box was opened and the rejects (unrepulped paper, bundles and shives) on the surface of the slotted screen were collected. The rejects were poured into a Buchner funnel containing a tared filter paper under suction. The filter paper containing the rejects was dried on a hot plate to constant weight (about 5 minutes), and the dry weight of the rejected fraction was recorded.

The accept fraction (fully repulped fibers) from the 150 mesh screen was collected with a Buchner funnel containing a tared filter paper. The filter paper was dried on a hot plate to constant weight (about 5 minutes), and the dry weight of the accepts was recorded.

Repulpability, as percent fiber recovery or percent fiber yield, was calculated as: 100×(dry weight of accepts)/(dry weight of accepts+rejects).

Table 1 shows the wet strength and repulpability values obtained with Kymene® 557H wet strength resin and the resins of Example 2 and Example 3.

TABLE 1

| Example | Resin | Repulpability | Wet Strength |
|---|---|---|---|
| Comparative Example 1 | Kymene ® 557H | 27 | 17.7 |
| Example 3 | 50:50 (SA:AA) | 43 | 13.8 |
| Example 2 | 80:20 (SA:AA) | 72 | 12.9 |

What is claimed is:

1. A process for repulping paper comprising:
   (a) providing paper comprising at least one cationic thermosetting resin comprising the reaction product of
      (i) at least one polyamide having secondary amine groups made from reactants comprising (α) at least one polyalkylene polyamine, (β) at least one of succinic acid or an ester or anhydride thereof and (γ) optionally at least one dicarboxylic acid (other than succinic acid) or an ester or anhydride thereof, and
      (ii) epihalohydrin; and
   (b) repulping the paper to obtain recycled pulp fibers, wherein the succinic acid or ester or anhydride thereof comprises at least 50 mole % of the total dicarboxylic acids or esters or anhydrides thereof used in making the polyamide.

2. The process of claim 1 wherein the polyalkylene polyamine is polyethylene polyamine.

3. The process of claim 2 wherein the dicarboxylic acid or ester or anhydride thereof is saturated and has from 3 to 8 C atoms, the epihalohydrin is epichlorohydrin, the molar ratio of polyalkylene polyamine to succinic acid and optional dicarboxylic acid is from about 0.8:1 to about 1.4:1, the mole ratio of epihalohydrin to the secondary amine in the polyamide is from about 0.5:1 to about 1.8:1 and the cationic thermosetting resin is present in an amount of from about 0.05 to about 2 weight % on a dry basis, based on the weight of the dry paper.

4. The process of claim 3 wherein the polyethylene polyamine has from 2 to 4 ethylene groups, 2 primary amine groups and from 1 to 3 secondary amine groups.

5. The process of claim 4 wherein the dicarboxylic acid or ester or anhydride thereof has from 4 to 6 C atoms, in making the polyamide the acid component comprises at least about 80 mole % of succinic acid or an ester or anhydride thereof and up to about 20 mole % of another dicarboxylic acid or ester or anhydride thereof, the molar ratio of polyalkylenepolyamine to succinic acid and optional dicarboxylic acid is from about 0.9:1 to about 1.2:1, the mole ratio of epihalohydrin to the secondary amine in the polyamide is from about 0.9:1 to about 1.5:1 and the cationic thermosetting resin is present in an amount of from about 0.1 to about 1 weight % on a dry basis, based on the weight of the dry paper.

6. The process of claim 5 wherein the polyethylene polyamine is diethylene triamine.

7. The process of claim 6 wherein the dicarboxylic acid or ester or anhydride thereof is adipic acid, the molar ratio of polyalkylene polyamine to succinic acid and adipic acid is from about 0.92:1 to about 1.14:1, the mole ratio of epihalohydrin to the secondary amine in the polyamides from about 1:1 to about 1:3:1 and the cationic thermosetting resin is present in an amount of from about 0.2 to about 0.5 weight % on a dry basis, based on the weight of the dry paper.

8. The process of claim 6 wherein in making the polyamide the acid component comprises about 100 mole % of succinic acid or an ester or anhydride thereof, the molar ratio of polyalkylene polyamine to succinic acid and optional dicarboxylic acid is from about 0.92:1 to about 1.14:1, the mole ratio of epihalohydrin to the secondary amine in the polyamide is from about 1:1 to about 1.3:1 and the cationic thermosetting resin is present in an amount of from about 0.2 to about 0.5 weight % on a dry basis, based on the weight of the dry paper.

9. The process of claim 5 wherein the dicarboxylic acid or ester or anhydride thereof is adipic acid.

10. The process of claim 5 wherein in making the polyamide the acid component comprises 100 mole % of succinic acid or an ester or anhydride thereof.

11. The process of claim 5 wherein the molar ratio of polyalkylene polyamine to succinic acid and optional dicarboxylic acid is at least about 0.92:1.

12. The process of claim 5 wherein the molar ratio of polyalkylene polyamine to succinic acid and optional dicarboxylic acid is up to about 1.14:1.

13. The process of claim 5 wherein the mole ratio of epihalohydrin to the secondary amine in the polyamide is at least about 1:1.

14. The process of claim 5 wherein the mole ratio of epihalohydrin to the secondary amine in the polyamide is up to about 1.3:1.

15. The process of claim 5 wherein the cationic thermosetting resin is present in an amount of at least about 0.2 weight % on a dry basis, based on the weight of the dry paper.

16. The process of claim 5 wherein the cationic thermosetting resin is present in an amount of up to about 0.5 weight % on a dry basis, based on the weight of the dry paper.

17. The process of claim 5 wherein the acid component comprises succinic acid and optionally at least one dicarboxylic acid other than succinic acid.

18. The process of claim 17 wherein the acid component is succinic acid.

19. The process of claim 3 wherein the dicarboxylic acid or ester or anhydride thereof has from 4 to 6 C atoms.

20. The process of claim 3 wherein in making the polyamide the acid component comprises at least about 80 mole % of succinic acid or an ester or anhydride thereof and up to about 20 mole % of dicarboxylic acid or an ester or anhydride thereof.

21. The process of claim 3 wherein in making the polyamide up to about 60% of the polyalkylene polyamine is replaced by a molecularly equivalent amount of aliphatic diamine.

22. The process of claim 3 wherein the molar ratio of polyalkylene polyamine to succinic acid and optional dicarboxylic acid is at least about 0.9:1.

23. a The process of claim 3 wherein the molar ratio of polyalkylene polyamine to succinic acid and optional dicarboxylic acid is up to about 1.2:1.

24. The process of claim 3 wherein the mole ratio of epihalohydrin to the secondary amine in the polyamide is at least about 0.9:1.

25. The process of claim 3 wherein the mole ratio of epihalohydrin to the secondary amine in the polyamide is up to about 1.5:1.

26. The process of claim 3 wherein the cationic thermosetting resin is present in amount of at least about 0.1 weight % on a dry basis, based on the weight of the dry paper.

27. The process of claim 3 wherein the cationic thermosetting resin is present in amount of up to about 1 weight % on a dry basis, based on the weight of the dry paper.

28. The process of claim 3 wherein the dicarboxylic acid or ester or anhydride thereof is selected from the group consisting of glutaric acid and adipic acid.

29. The process of claim 3 wherein the acid component comprises succinic acid and optionally at least one dicarboxylic acid other than succinic acid.

30. The process of claim 1 wherein the dicarboxylic acid or ester or anhydride thereof is saturated and has from 3 to 8 C atoms.

31. The process of claim 1 wherein the epihalohydrin is epichlorohydrin.

32. The process of claim 1 wherein in making the polyamide the acid component comprises up to about 100 mole % of succinic acid or an ester or anhydride thereof.

33. The process of claim 1 wherein the molar ratio of polyalkylenepolyamine to succinic acid and optional dicarboxylic acid is at least about 0.8:1.

34. The process of claim 1 wherein the molar ratio of polyalkylenepolyamine to succinic acid and optional dicarboxylic acid is up to about 1.4:1.

35. The process of claim 1 wherein the mole ratio of epihalohydrin to the secondary amine in the polyamide is at least about 0.5:1.

36. The process of claim 1 wherein the mole ratio of epihalohydrin to the secondary amine in the polyamide is up to about 1.8:1.

37. The process of claim 1 wherein the cationic thermosetting resin is present in an amount of at least about 0.05 weight % on a dry basis, based on the weight of the dry paper.

38. The process of claim 1 wherein the cationic thermosetting resin is present in an amount of up to about 2 weight % on a dry basis, based on the weight of the dry paper.

39. The process of claim 1 wherein the polyalkylene polyamine has from 2 to 8 carbon atoms.

40. The process of claim 1 wherein the polyalkylene polyamine is selected from the group consisting of diethylenetriamine, triethylenetetramine, tetraethylenepentamine and dipropylenetriamine.

41. The process of claim 1 wherein the dicarboxylic acid or ester or anhydride thereof is selected from the group consisting of malonic acid, glutaric acid and adipic acid.

42. The process of claim 1 wherein the polyamide is made from reactants comprising ($\alpha$) at least one polyalkylene polyamine, ($\beta$) succinic acid and ($\gamma$) optionally at least one dicarboxylic acid (other than succinic acid).

* * * * *